(12) United States Patent
Kwon

(10) Patent No.: US 11,654,848 B2
(45) Date of Patent: May 23, 2023

(54) REAR BUMPER STRUCTURE OF VEHICLE

(71) Applicants: Hyundai Motor Company, Seoul (KR); Kia Corporation, Seoul (KR)

(72) Inventor: Hosung Kwon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/592,000

(22) Filed: Feb. 3, 2022

(65) Prior Publication Data

US 2023/0084660 A1   Mar. 16, 2023

(30) Foreign Application Priority Data

Sep. 15, 2021 (KR) .......... 10-2021-0122904

(51) Int. Cl.
*B60R 19/38* (2006.01)
*B60R 19/18* (2006.01)

(52) U.S. Cl.
CPC ........ *B60R 19/38* (2013.01); *B60R 2019/186* (2013.01)

(58) Field of Classification Search
CPC ........ B60R 19/38; B60R 19/40; B60R 19/02; B60R 19/46; B60R 2019/186; B62D 21/15; B62D 21/152; B60Y 2200/33
USPC .......................................... 293/118, 150, 145
See application file for complete search history.

(56) References Cited

U.S. PATENT DOCUMENTS

| 2,672,363 | A | * | 3/1954 | Buchanan | B60R 19/14 293/118 |
|---|---|---|---|---|---|
| 6,926,326 | B2 | * | 8/2005 | Iyoda | B60R 19/38 293/118 |
| 8,602,439 | B2 | * | 12/2013 | Lee | B60D 1/60 280/491.1 |
| 8,753,660 | B2 | * | 6/2014 | Behnam | A61K 38/1875 424/676 |
| 2015/0165995 | A1 | * | 6/2015 | Cha | B60P 1/44 293/106 |
| 2015/0315837 | A1 | | 11/2015 | Salmon et al. | |
| 2018/0009402 | A1 | * | 1/2018 | Cha | B60R 19/023 |

FOREIGN PATENT DOCUMENTS

| KR | 100186986 B1 |   | 12/1998 |
|---|---|---|---|
| KR | 100186986 B1 | * | 5/1999 |
| KR | 101913703 B1 |   | 10/2018 |
| KR | 102149942 B1 |   | 8/2020 |
| KR | 102235077 B1 | * | 3/2021 |

* cited by examiner

*Primary Examiner* — Joseph D. Pape
*Assistant Examiner* — Veronica M Shull
(74) *Attorney, Agent, or Firm* — Slater Matsil, LLP

(57) ABSTRACT

A rear bumper structure includes a lower side member at both sides of a vehicle parallel to a length direction of a floor panel and below the floor panel, an upper side member at both sides of the vehicle parallel to the length direction of the floor panel and above the floor panel and connected to the lower side member by a rear cross member, a bracket having a first end fixed to the lower side member and a second end extending in a bent form toward the rear of the vehicle, a bumper having a first end hinge-coupled to the second end of the bracket and a second end extending in a bent form from the first end toward an outside of the vehicle, and a crash box fixed to the second end of the bumper and coupled to the upper side member.

20 Claims, 4 Drawing Sheets

REAR BUMPER STRUCTURE OF VEHICLE

CROSS-REFERENCE TO RELATED APPLICATIONS

This application claims the benefit of Korean Patent Application No. 10-2021-0122904, filed on Sep. 15, 2021, which application is hereby incorporated herein by reference.

TECHNICAL FIELD

The present invention relates to a rear bumper structure of a vehicle.

BACKGROUND

Generally, market demand for delivery and logistics vehicles in the mobility market is growing, so that a van structure is required even in A and B segments. In a case of A, B, and C segment vehicles, a floor clearance is manufactured in a range of about 350 mm to about 400 mm in consideration of passenger ride-ability, a vehicle height, and a tire size, and a height of a rear bumper back beam is manufactured in a range of about 406 mm to about 508 mm from the ground, so that a full flat floor platform is not possible. For the full flat floor platform, the floor clearance should be raised by about 150 mm or more, but this is difficult due to the passenger's getting on and off, the increase in the overall height of the vehicle, and the increase in the center of gravity of the vehicle. For this reason, there is no van model that shares the passenger car platform with the small car class (A, B, and C segment vehicles).

In order to satisfy domestic and foreign van regulations and practicality, a flat floor should be implemented even when a tail gate is opened, and for this, a structure in which a ground clearance of a rear opening is the same as a floor height is required.

The above information disclosed in this Background section is only for enhancement of understanding of the background of the invention, and therefore it may contain information that does not form the prior art that is already known to a person of ordinary skill in the art.

SUMMARY

The present invention relates to a rear bumper structure of a vehicle. Particular embodiments relate to a rear bumper structure in which a central portion of a tail gate of a vehicle is opened and closed.

Embodiments of the present invention provide a rear bumper structure of a vehicle that may realize a full flat floor structure by separating a bumper of a tail gate of a vehicle to configure a hinge on a lower side member and by adopting a structure in which the bumper of the tail gate rotates 90° when the tail gate is opened or after the tail gate is opened.

An embodiment of the present invention provides a rear bumper structure that opens and closes a central portion of a rear bumper provided at a rear side of a vehicle by hinge rotation, including a lower side member that is disposed at both sides of the vehicle, and is disposed parallel to a length direction of a floor panel below the floor panel of the vehicle, an upper side member that is disposed at both sides of the vehicle, is disposed parallel to the length direction of the floor panel above the floor panel, and is connected to the lower side member by a rear cross member, a rear center bumper rotation bracket that is provided with one end fixed to the lower side member and the other end extending in a bent form toward the rear side of the vehicle body, a rear center bumper that is provided with one end hinge-coupled to the other end of the rear center bumper rotation bracket and the other end extending in a bent form from the one end toward the outside of the vehicle body, and a crash box that is fixed to the other end of the rear center bumper, and is coupled to the upper side member by rotating together according to hinge rotation of the rear center bumper.

Both end portions of the crash box may be connected to each other by a rear back beam extending in a horizontal direction of the vehicle.

The crash box may include a crash box extension fixed to the other end of the rear center bumper and a latch provided at an end portion of the crash box extension and inserted into and fixed to an end portion of the upper side member.

A groove in a shape retracted toward a front side of the vehicle body may be formed at the end of the upper side member, and the latch may be inserted into the groove according to rotation of the crash box.

A partition wall that is positioned to be spaced apart from an end portion of the latch by a predetermined distance when the latch is inserted into the groove may be provided in the groove.

When, by the rear center bumper being hinge-rotated, the latch is inserted into the groove, a striker to which the latch is coupled and fixed may be provided in the groove.

A butt plate may be provided between the end portion of the crash box extension and the latch, the latch may be provided with a coupling plate that faces the butt plate and extends across the latch, and the butt plate and the coupling plate may be coupled to be spaced apart from each other by a predetermined distance by a fitting pin.

One end of the rear center bumper rotation bracket may be fixed to an upper portion of the lower side member by a bolt.

A rubber damper with which one end of the rear center bumper is in contact may be provided at an end portion of the lower side member, when the other end of the rear center bumper is positioned to face the rear side of the vehicle body.

The rear center bumper may hinge-rotate from the rear center bumper rotation bracket by operating a latch release lever connected to the crash box.

According to an embodiment of the present invention, it is possible to implement a full flat floor platform that is the standard of the van law, and to realize a structure that may satisfy a rear collision law of a van vehicle.

In addition, it is possible to secure a function of a semi-pick-up truck, to improve user convenience when loading and unloading luggage, and to secure additional loading space for long luggage to improve a loading function.

Figure 1:
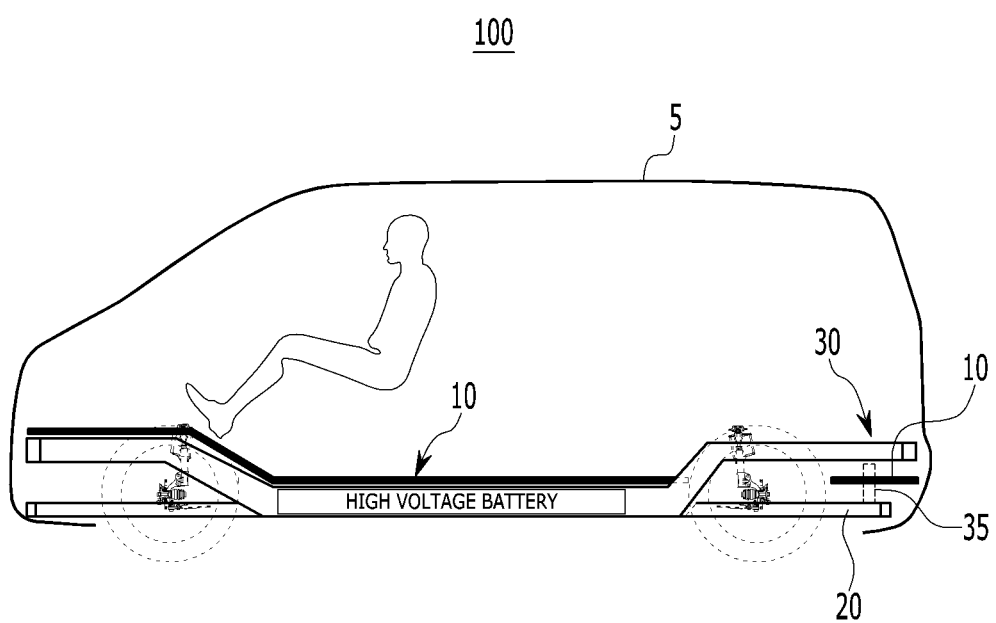
FIG. 1 schematically illustrates a rear bumper structure of a vehicle when viewed from a side thereof, according to an embodiment of the present invention.

The following elements may be used in connection with the drawings to describe embodiments of the present invention.

| | |
|---|---|
| 5: vehicle body | 7: tail gate |
| 8: latch release lever | 10: floor panel |
| 20: lower side member | 22: rubber damper |
| 25: rear back beam | 30: upper side member |
| 31: groove | 35: rear cross member |
| 32: partition wall | 34: striker |
| 40: rear center bumper rotation bracket | |
| 42: bolt | 50: rear center bumper |
| 60: crash box | 62: crash box extension |
| 63: butt plate | 64: latch |
| 65: coupling plate | 67: fitting pin |
| 100: vehicle | |

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Further, with embodiments of the present invention, detailed description is made as to the constituent elements in a first embodiment with reference to the relevant drawings by using the same reference numerals for the same constituent elements, while only the constituent elements different from those related to the first embodiment are described in other embodiments.

The drawings are schematic, and are not illustrated in accordance with a scale. Relative dimensions and ratios of portions in the drawings are illustrated to be exaggerated or reduced in size for clarity and convenience, and the dimensions are just examples and are not limiting. In addition, like structures, elements, or components illustrated in two or more drawings use same reference numerals for showing similar features. It will be understood that when an element such as a layer, film, region, area, or substrate is referred to as being "on" another element, it can be directly on the other element or intervening elements may also be present.

The embodiments of the present invention show embodiments of the present invention in detail. As a result, various modifications of the drawings will be expected. Therefore, the embodiments are not limited to a specific shape of an illustrated region, but, for example, include a change in the shape in accordance with manufacturing.

Hereinafter, a real bumper structure of a vehicle according to embodiments of the present invention will be described in detail with reference to the accompanying drawings.

Figure 2:
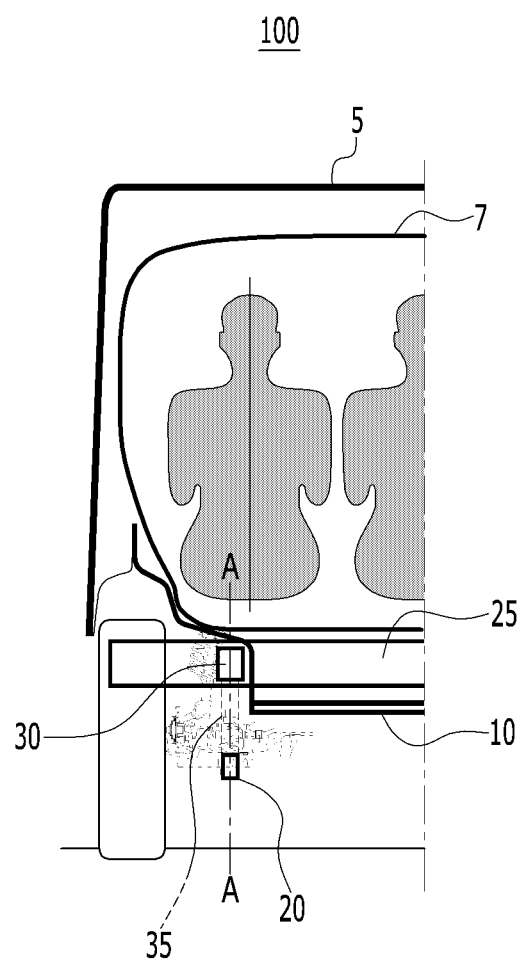
FIG. 2 schematically illustrates a rear bumper structure of a vehicle when viewed from a rear side thereof, according to an embodiment of the present invention.

FIG. 1 schematically illustrates a rear bumper structure of a vehicle when viewed from a side thereof, according to an embodiment of the present invention, and FIG. 2 schematically illustrates a rear bumper structure of a vehicle when viewed from a rear side thereof, according to an embodiment of the present invention.

Referring to FIGS. 1 and 2, a rear bumper structure of a vehicle 100 according to an embodiment of the present invention is a rear bumper structure that opens and closes a central portion of a rear bumper provided at a rear side of the vehicle 100 by hinge rotation, and includes a lower side member 20 and an upper side member 30.

The lower side member 20 is disposed along a length direction of the vehicle 100 at both sides of the vehicle 100, and is disposed so as to be parallel to a length direction of a floor panel 10 at a lower portion of the floor panel 10 of the vehicle 100.

The upper side member 30 is disposed along the length direction of the vehicle 100 on both sides of the vehicle 100 at a position corresponding to the lower side member 20, and is disposed so as to be parallel to the length direction of the floor panel 10 at an upper portion of the floor panel 10. A central portion of the upper side member 30 is formed to be stepped to have a lower height than front and rear portions of the upper side member 30, and the upper side member 30 is disposed below the floor panel 10 at a center portion of the vehicle 100 and is disposed above the floor panel 10 at a rear portion of the vehicle 100. A high voltage battery may be disposed between the upper side members 30 of both sides below the floor panel 10 at the central portion of the vehicle 100.

In the rear portion of the vehicle 100, the lower side member 20 and the upper side member 30 are disposed so as to vertically correspond to each other with the floor panel 10 interposed therebetween, and the upper portion of the lower side member 20 and the lower portion of the upper side member 30 may be connected to each other by a rear cross member 35.

Both end portions of a crash box 60 disposed at both sides of the vehicle 100 are connected to each other by a rear back beam 25 extending in a horizontal direction at the rear portion of the vehicle 100.

In a central portion between both end portions of the upper side member 30, a tail gate 7 is disposed to cover the rear back beam 25, and a lower portion of the tail gate 7 is connected to a rear center bumper 50 to be opened and closed according to hinge rotation of the rear center bumper 50.

Figure 3:
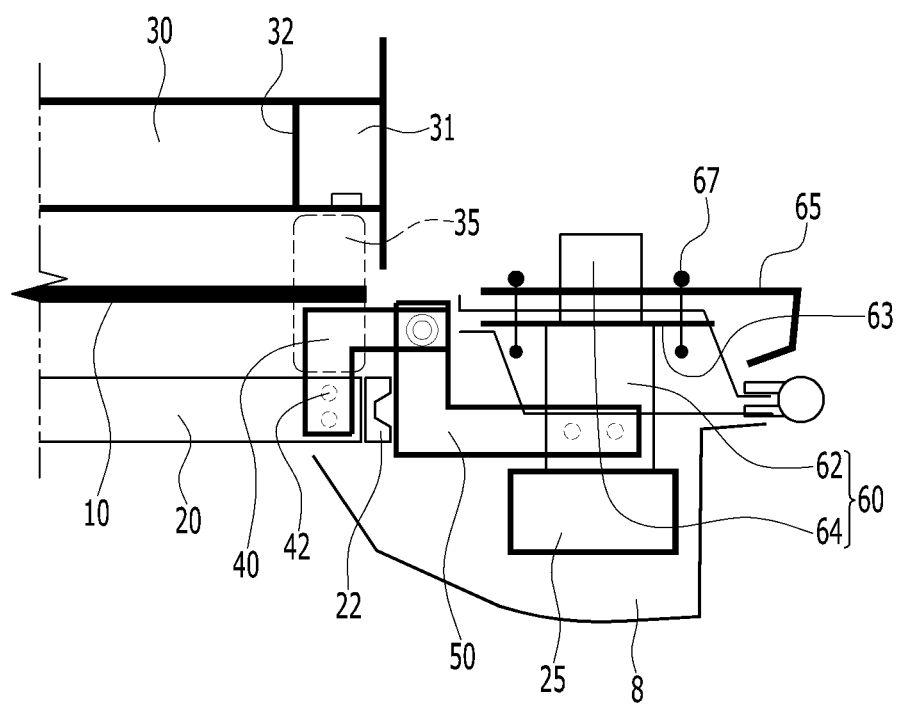
FIG. 3 illustrates, in a rear bumper structure of a vehicle according to an embodiment of the present invention, a schematic cross-sectional view of a state when a rear bumper is opened, taken along line A-A of FIG. 2.
Figure 4:
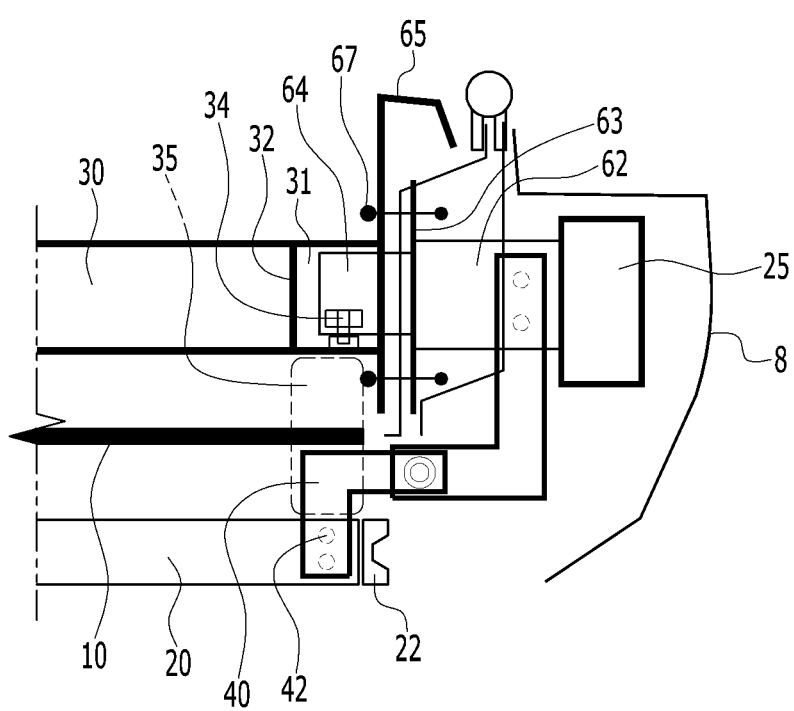
FIG. 4 illustrates, in a rear bumper structure of a vehicle according to an embodiment of the present invention, a schematic cross-sectional view of a state when a rear bumper is closed, taken along line A-A of FIG. 2.

FIG. 3 illustrates, in a rear bumper structure of a vehicle according to an embodiment of the present invention, a schematic cross-sectional view of a state when a rear bumper is opened, taken along line A-A' of FIG. 2, and FIG. 4 illustrates, in a rear bumper structure of a vehicle according to an embodiment of the present invention, a schematic cross-sectional view of a state when a rear bumper is closed, taken along line A-A' of FIG. 2.

Referring to FIG. 3 and FIG. 4, a rear bumper structure of a vehicle according to an embodiment of the present invention may further include a rear center bumper rotation bracket 40, the rear center bumper 50, and the crash box 60.

The rear center bumper rotation bracket 40 has a shape bent in a '⌐' shape, one end thereof is fixed to the lower side member 20, and the other end thereof extends in a bent shape toward a rear side of a vehicle body 5.

The rear center bumper 50 has a shape bent in a '⌐' shape, one end thereof is hingedly coupled to the other end of the rear center bumper rotation bracket 40, and the other end thereof extends in a bent form from the one end toward the outside of the vehicle body 5 in an opened state of the rear center bumper 50. One end of the rear center bumper 50 and the other end of the rear center bumper rotation bracket 40 may be hinge-rotatably coupled by a bolt.

The rear center bumper rotation bracket 40 may be disposed below the floor panel 10, the rear center bumper 50 may be disposed below the floor panel 10 in the opened state of the rear center bumper 50, and the other end of the rear center bumper 50 may be disposed above the floor panel 10 in the closed state of the rear center bumper 50.

The crash box 60 may be fixed to the other end of the rear center bumper 50, and they may be rotated together, as the rear center bumper 50 is hinge-rotated, to be coupled to the upper side member 30. The crash box 60 includes a crash box extension 62 fixed to the other end of the rear center bumper 50, and a latch 64 provided at an end portion of the crash box extension 62. The crash box extension 62 is fixed to the rear center bumper 50 by a bolt in a direction perpendicular to an extension direction of the rear center bumper 50, and the latch 64 is coupled to an end portion of the crash box extension 62 in an extension direction of the crash box extension 62. In addition, the rear back beam 25 is provided at the other side of the crash box extension 62, so that left and right end portions of the vehicle 100 of the crash box extension 62 may be connected to each other by the rear back beam 25.

The crash box 60 may rotate according to the hinge rotation of the rear center bumper 50, and the latch 64 may be inserted into and fixed to the end portion of the upper side member 30. When a user operates a latch release lever 8 connected to the crash box 60, the rear center bumper 50 may be hingedly rotated from the rear center bumper rotation bracket 40. The latch release lever 8 may be provided to cover the crash box extension 62 and the rear back beam 25.

A groove 31 in a retracted form toward the front of the vehicle body 5 may be formed at the end portion of the upper side member 30, and the latch 64 is inserted into and fixed to the groove 31 according to the hinge rotation of the rear center bumper 50 to close the rear center bumper 50.

A partition wall 32 is provided in the groove 31 to be spaced apart from the end portion of the latch 64 by a predetermined distance when the latch 64 is inserted into the groove 31, so that it is possible to reduce the transmission of impact from the rear center bumper 50 to the upper side member 30 in an event of a rear collision of the vehicle 100, and it is possible to prevent the latch 64 from being pushed into the upper side member 30.

A striker 34, to which the latch 64 is coupled and fixed when the rear center bumper 50 is hinge-rotated and the latch 64 is inserted into the groove 31, is provided in the groove 31, so that the crash box 60 may be stably fixed in the groove 31.

On the other hand, a butt plate 63 extending across the latch 64 may be provided between the end portion of the crash box extension 62 and the latch 64, and the latch 64 may be provided with a coupling plate 65 that faces parallel to the butt plate 63 and extends across the latch 64. The butt plate 63 and the coupling plate 65 may be coupled to be spaced apart from each other by a predetermined distance by a fitting pin 67.

By disposing the butt plate 63 and the coupling plate 65 to face each other and to be parallel to each other, the transmission of impact from the rear center bumper 50 to the upper side member 30 in the event of the rear collision of the vehicle 100 may be reduced.

In addition, in the opened state of the rear center bumper 50, the coupling plate 65 may be positioned at the same height as the floor panel 10. In the rear portion of the vehicle 100, the floor panel 10 is vertically disposed between the lower side member 20 and the upper side member 30, and the coupling plate 65 is positioned at the same height as the floor panel 10 in the opened state of the rear center bumper 50, so that a full flat floor platform may be implemented even when the tail gate 7 is opened.

One end of the rear center bumper rotation bracket 40 may be fixed to the upper portion of the lower side member 20 by a plurality of bolts 42. In addition, a rubber damper 22 may be provided at the rear end portion of the lower side member 20. The rubber damper 22 may be in contact with one end of the rear center bumper 50 by the rear center bumper 50 being hinge-rotated, when the rear center bumper 50 is opened, that is, when the other end of the rear center bumper 50 is positioned to face toward the rear side of the vehicle body 5. The rubber damper 22 may stably support the rear center bumper 50 in the opened state of the rear center bumper 50, and may serve to absorb the impact transmitted from the rear center bumper 50 to the lower side member 20.

As described above, according to the rear bumper structure of embodiments of the present invention, it is possible to implement a full flat floor platform that is the standard of the van law, and to realize the structure that may satisfy the rear collision law of the van vehicle.

In addition, it is possible to secure a function of a semi-pick-up truck, to improve user convenience when loading and unloading luggage, and to secure additional loading space for long luggage to improve a loading function.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A rear bumper structure for opening and closing a central portion of a rear bumper provided at a rear side of a vehicle by hinge rotation, the rear bumper structure comprising:
    a lower side member disposed at both sides of the vehicle parallel to a length direction of a floor panel of the vehicle below the floor panel of the vehicle;
    an upper side member disposed at both sides of the vehicle parallel to the length direction of the floor panel above the floor panel and connected to the lower side member by a rear cross member;
    a rear center bumper rotation bracket having a first end fixed to the lower side member and a second end extending in a bent form toward the rear side of the vehicle;
    a rear center bumper having a first end hinge-coupled to the second end of the rear center bumper rotation bracket and a second end extending in a bent form from the first end toward an outside of the vehicle; and
    a crash box fixed to the second end of the rear center bumper and configured to be coupled to the upper side member by rotating together according to hinge rotation of the rear center bumper.

2. The rear bumper structure of claim 1, further comprising a rear back beam extending in a horizontal direction of the vehicle and connecting both end portions of the crash box to each other.

3. The rear bumper structure of claim 1, wherein the first end of the rear center bumper rotation bracket is fixed to an upper portion of the lower side member by a bolt.

4. The rear bumper structure of claim 1, further comprising a rubber damper provided at an end portion of the lower side member, wherein the first end of the rear center bumper is in contact with the rubber damper in a state in which the second end of the rear center bumper is positioned to face the rear side of the vehicle.

5. The rear bumper structure of claim 1, wherein the rear center bumper is configured to hinge-rotate from the rear center bumper rotation bracket by operating a latch release lever connected to the crash box.

6. The rear bumper structure of claim 1, wherein a central portion of the upper side member is disposed below the floor panel of the vehicle, and wherein a rear portion of the upper side member is disposed above the floor panel of the vehicle.

7. A rear bumper structure for opening and closing a central portion of a rear bumper provided at a rear side of a vehicle by hinge rotation, the rear bumper structure comprising:
   a lower side member disposed at both sides of the vehicle parallel to a length direction of a floor panel of the vehicle below the floor panel of the vehicle;
   an upper side member disposed at both sides of the vehicle parallel to the length direction of the floor panel above the floor panel and connected to the lower side member by a rear cross member;
   a rear center bumper rotation bracket having a first end fixed to the lower side member and a second end extending in a bent form toward the rear side of the vehicle;
   a rear center bumper having a first end hinge-coupled to the second end of the rear center bumper rotation bracket and a second end extending in a bent form from the first end toward an outside of the vehicle; and
   a crash box fixed to the second end of the rear center bumper and configured to be coupled to the upper side member by rotating together according to hinge rotation of the rear center bumper, wherein the crash box comprises:
      a crash box extension fixed to the second end of the rear center bumper; and
      a latch provided at an end portion of the crash box extension and inserted into and fixed to an end portion of the upper side member.

8. The rear bumper structure of claim 7, wherein:
   a groove in a shape retracted toward a front side of the vehicle is disposed at the end portion of the upper side member; and
   the latch is configured to be inserted into the groove according to rotation of the crash box.

9. The rear bumper structure of claim 8, further comprising a partition wall provided in the groove, wherein the partition wall is spaced apart from an end portion of the latch by a predetermined distance in a state in which the latch is inserted into the groove.

10. The rear bumper structure of claim 8, wherein, in a state in which the rear center bumper has been hinge-rotated, the latch is inserted into the groove and a striker to which the latch is coupled and fixed is provided in the groove.

11. The rear bumper structure of claim 7, further comprising:
   a butt plate provided between the end portion of the crash box extension and the latch; and
   a coupling plate provided with the latch, the coupling plate facing the butt plate and extending across the latch.

12. The rear bumper structure of claim 11, wherein the butt plate and the coupling plate are coupled to be spaced apart from each other by a predetermined distance by a fitting pin.

13. A vehicle comprising:
   a vehicle body;
   a floor panel extending along a lower surface of the vehicle body;
   a rear bumper provided at a rear end of the vehicle body, wherein a central portion of the rear bumper is configured to be opened and closed by hinge rotation;
   a lower side member disposed at both sides of the vehicle body parallel to a length direction of the floor panel and below the floor panel;
   an upper side member disposed at both sides of the vehicle parallel to the length direction of the floor panel and above the floor panel;
   a rear cross member connecting the upper side member to the lower side member;
   a rear center bumper rotation bracket having a first end fixed to the lower side member and a second end extending in a bent form toward the rear end of the vehicle body;
   a rear center bumper having a first end hinge-coupled to the second end of the rear center bumper rotation bracket and a second end extending in a bent form from the first end toward an outside of the vehicle body;
   a crash box fixed to the second end of the rear center bumper and configured to be coupled to the upper side member by rotating together according to hinge rotation of the rear center bumper; and
   a rear back beam extending in a horizontal direction of the vehicle and connecting both end portions of the crash box to each other.

14. The vehicle of claim 13, wherein the first end of the rear center bumper rotation bracket is fixed to an upper portion of the lower side member by a bolt.

15. The vehicle of claim 13, further comprising a rubber damper provided at an end portion of the lower side member, wherein the first end of the rear center bumper is in contact with the rubber damper in a state in which the second end of the rear center bumper is positioned to face the rear end of the vehicle body.

16. The vehicle of claim 13, further comprising a latch release lever connected to the crash box, wherein the rear center bumper is configured to hinge-rotate from the rear center bumper rotation bracket by operating the latch release lever.

17. The vehicle of claim 13, wherein the crash box comprises:
   a crash box extension fixed to the second end of the rear center bumper; and
   a latch provided at an end portion of the crash box extension and inserted into and fixed to an end portion of the upper side member.

18. The vehicle of claim 17, wherein:
   a groove in a shape retracted toward a front side of the vehicle is disposed at the end portion of the upper side member; and
   the latch is configured to be inserted into the groove according to rotation of the crash box.

19. The vehicle of claim 18, further comprising a partition wall provided in the groove, wherein the partition wall is spaced apart from an end portion of the latch by a predetermined distance in a state in which the latch is inserted into the groove.

20. The vehicle of claim 17, further comprising:
   a butt plate provided between the end portion of the crash box extension and the latch; and
   a coupling plate provided with the latch, the coupling plate facing the butt plate and extending across the latch, wherein the butt plate and the coupling plate are coupled to be spaced apart from each other by a predetermined distance by a fitting pin.

* * * * *